(12) United States Patent
Yoshida

(10) Patent No.: US 8,041,846 B2
(45) Date of Patent: Oct. 18, 2011

(54) APPARATUS WITH REDUCED LATENCY FOR MASTER AND SLAVE STORAGE DEVICES

(75) Inventor: Kenji Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 12/546,606

(22) Filed: Aug. 24, 2009

(65) Prior Publication Data

US 2010/0046110 A1  Feb. 25, 2010

(30) Foreign Application Priority Data

Aug. 25, 2008  (JP) .................. 2008-215518

(51) Int. Cl.
*G06F 3/00* (2006.01)
*G06F 13/12* (2006.01)

(52) U.S. Cl. ............. 710/15; 710/16; 710/17; 710/18; 710/36; 710/62; 710/74

(58) Field of Classification Search ............... None
See application file for complete search history.

(56) References Cited

U.S. PATENT DOCUMENTS 7,281,072 B2 * 10/2007 Liu et al. .......... 710/240
2003/0191874 A1 * 10/2003 Drescher et al. .......... 710/38

FOREIGN PATENT DOCUMENTS

JP   2008-015856 A   1/2008

* cited by examiner

*Primary Examiner* — Alan Chen
(74) *Attorney, Agent, or Firm* — Kilpatrick Townsend & Stockton LLP

(57) ABSTRACT

Disclosed is an information processing apparatus. The information processing apparatus includes a first hard disk drive, a conversion circuit and a signal control circuit. The conversion circuit is connected with the first hard disk drive to determine whether a second hard disk drive corresponding to a slave exists when the first hard disk drive serves as a master, and the determine whether a first control signal has a first logic level in a first predetermined time.

8 Claims, 3 Drawing Sheets

APPARATUS WITH REDUCED LATENCY FOR MASTER AND SLAVE STORAGE DEVICES

CROSS REFERENCES TO RELATED APPLICATIONS

The entire disclosure of Japanese Patent Application No. 2008-215518, filed Aug. 25, 2008 is expressly incorporated by reference herein.

BACKGROUND

1. Technical Field

The present invention relates to an information processing apparatus and a control method thereof. More particularly, the present invention relates to an information processing apparatus including a conversion circuit connected with a hard disk drive and a control method thereof.

2. Related Art

An interface of a hard disk drive used as an information processing apparatus, for example, has been changed from an ATA (advanced technology attachment) interface to a serial ATA interface as disclosed in JP-A-2008-15856. When a hard disk drive employing the serial ATA interface is used as an information processing apparatus employing the ATA interface, an ATA/serial ATA conversion circuit is provided between the ATA interface of the information processing apparatus and the serial ATA interface of the hard disk drive, so that the hard disk drive employing the serial ATA interface can be used.

In such a case, the ATA/serial ATA conversion circuit systematically determines if the hard disk drive connected with the ATA/serial ATA conversion circuit is only a master (device 0) of an ATA standard, or a slave (device 1) as well as the master (device 0) after the hard disk drive starts to operate. Further, the ATA/serial ATA conversion circuit automatically determines that self-diagnosis of the slave (device 1) has been completed based on a PDIAG signal received from the slave (device 1).

However, in a case in which an information processing apparatus, which does not allow the slave (device 1) to be connected with the master (device 0), when the ATA/serial ATA conversion circuit is used, the ATA/serial ATA conversion circuit waits for a control signal, which must be output from the slave (device 1), until a predetermined timeout period passes in order to perform the above functions, so a lot of time is required for starting the information processing apparatus. Thus, even if a user wants to use the information processing apparatus immediately, the user must wait until the information processing apparatus starts to operate.

Further, such a problem may occur in an interface conversion circuit, which performs conversion between interfaces having specifications different from each other, and an information processing apparatus including various conversion circuits, which are connected with a hard disk drive, as well as the ATA/serial ATA conversion circuit.

SUMMARY

An advantage of some aspects of the invention is to shorten the start time of an information processing apparatus including a conversion circuit connected with a hard disk drive.

According to an aspect of the invention, there is provided an information processing apparatus including: a first hard disk drive; a conversion circuit connected with the first hard disk drive to determine whether a second hard disk drive corresponding to a slave exists when the first hard disk drive serves as a master, and the determine whether a first control signal has a first logic level in a first predetermined time; and a signal control circuit that allows the first control signal to have the first logic level in the first predetermined time in response to a second control signal, which is generated when the first hard disk drive starts, regardless of the existence of the second hard disk drive. The conversion circuit monitors change in the first control signal to stop the start process before the first predetermined time ends when the first control signal has a second logic level, and performs the start process even if the first predetermined time has not passed when it is detected that the first control signal has the first logic level.

In this case, the second control signal may include a physical layer ready signal which represents that the initialization of communication between the first hard disk drive and the conversion circuit has been completed.

In this case, when completion of the initialization of the communication between the first hard disk drive and the conversion circuit is detected through change in the physical layer ready signal, the signal control circuit may detect the change in the physical layer ready signal to delay the physical layer ready signal by a second predetermined time such that the first control signal is switched from the first logic level to the second logic level, and the conversion circuit may detect that the first control signal has the first logic level during the second predetermined time.

Alternatively, the second control signal may include a hard disk drive reset signal for resetting the first hard disk drive.

In this case, when cancellation of reset of the first hard disk drive is detected through change in the hard disk drive reset signal, the signal control circuit may detect the change in the hard disk drive reset signal to delay the hard disk drive reset signal by a third predetermined time such that the first control signal is switched from the first logic level to the second logic level, and the conversion circuit detects that the first control signal has the first logic level during the third predetermined time.

In this case, the signal control circuit may allow the conversion circuit to arbitrarily switch the logic level of the first control signal to the first logic level or the second logic level when the output of the first control signal is in a high impedance state after the passage of the third predetermined time, and the conversion circuit may use the first control signal as a signal, which represents the presence or absence of access to the first hard disk drive, after the passage of the third predetermined time.

In addition, the first hard disk drive may have a structure in which the second hard disk drive serving as the slave is not connected with the first hard disk drive, and the information processing apparatus starts an operation in a state in which the second hard disk drive serving as the slave is not connected with the first hard disk drive.

According to an another aspect of the invention, there is provided a method for controlling an information processing apparatus including a first hard disk drive and a conversion circuit connected with the first hard disk drive, the method includes: determining by the conversion circuit whether a second hard disk drive corresponding to a slave exists when the first hard disk drive serves as a master, and whether a first control signal has a first logic level in a first predetermined time; monitoring by the conversion circuit change in the first control signal to stop the start process before the first predetermined time ends when the first control signal has a second logic level, and performing the start process even if the first predetermined time has not passed when it is detected that the first control signal has the first logic level; and performing by the conversion circuit the start process by allowing the first control signal to have the first logic level in the first predetermined time in response to a second control signal, which is generated when the first hard disk drive starts, regardless of the existence of the second hard disk drive.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the present invention will be described with reference to the accompanying drawings. Further, the technical scope of the present invention is not limited to the following embodiments.

First Embodiment

Figure 1:
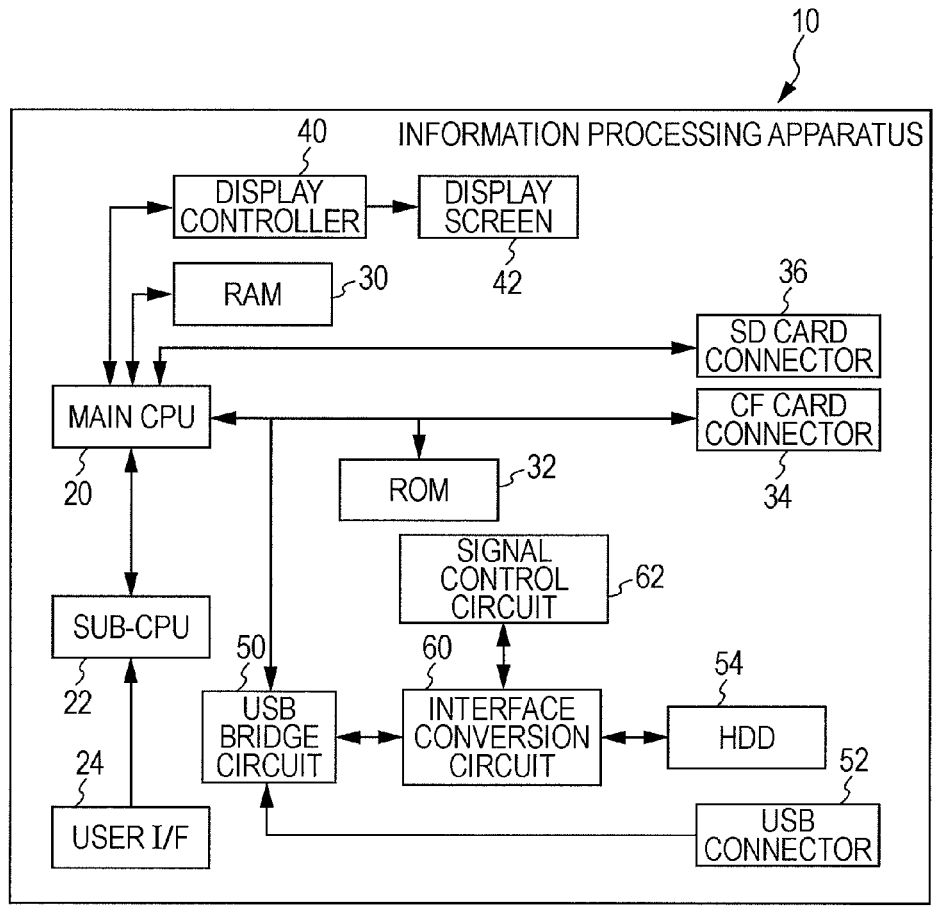
FIG. 1 is a block diagram showing an internal configuration of an information processing apparatus according to one embodiment of the present invention.

FIG. 1 is a block diagram showing an internal configuration of an information processing apparatus 10 according to the present embodiment. According to the embodiment, the information processing apparatus 10 includes a small-sized image display apparatus called a photo viewer, a portable music player and the like. However, the information processing apparatus 10 is not limited to the image display apparatus and the music player. That is, the information processing apparatus 10 may include a personal computer such as a notebook or a desktop computer.

As shown in FIG. 1, the information processing apparatus 10 according to the embodiment includes a main central processing unit (CPU) 20 and a sub-CPU 22. The main CPU 20 generally controls the information processing apparatus 10 in cooperation with the sub-CPU 22. The sub-CPU 22 is connected with the user interface 24 to receive various instructions from the users through the user interface 24.

For example, the user interface 24 may include one or a plurality of buttons, a keyboard, a pointing device and a combination thereof. Referring to FIG. 1, the user interface 24 is provided in the information processing apparatus 10. However, the user interface 24 may be provided out of the information processing apparatus 10. The main CPU 20 and the sub-CPU 22 perform various control operations based on the instructions received through the user interface 24.

According to the information processing apparatus 10 of the embodiment, a random access memory (RAM) 30 is connected with the main CPU 20. The main CPU 20 is connected with the RAM 30 through a dedicated bus.

Further, the main CPU 20 is connected with a read only memory (ROM) 32, a compact flash (CF: registered trademark) card connector 34 and an SD (registered trademark) card connector 36. According to the embodiment, the main CPU 20, the ROM 32 and the CF card connector 34 are connected with each other through a universal bus, and the main CPU 20 is connected with the SD card connector 36 through the dedicated bus.

The CF card connector 34 allows the information processing apparatus 10 to access a CF card and includes a CF card interface, an insertion slot, various controllers and the like. The SD card connector 36 allows the information processing apparatus 10 to access an SD card and includes an SD card interface, an insertion slot, various controllers and the like.

The main CPU 20 is connected with a display screen 42 through a display controller 40. The display screen 42 can be prepared in the form of a liquid crystal display (LCD), a cathode ray tube (CRT) and the like. The display controller 40 performs various control operations to display various images or characters on the display screen 42.

Further, the main CPU 20 is connected with a universal serial bus (USB) bridge circuit 50 through the universal bus, and is connected with a USB connector 52 and a hard disk drive 54 through the USB bridge circuit 50. The USB connector 52 allows the information processing apparatus 10 to access a device of a USB standard and includes a USB interface, an insertion slot, various controllers and the like.

According to the embodiment, the USB bridge circuit 50 is based on the specifications for an ATA interface and the hard disk drive 54 is based on the specifications for a serial ATA interface. In this regard, an interface conversion circuit 60 is provided between the USB bridge circuit 50 and the hard disk drive 54 to perform signal conversion between the ATA interface and the serial ATA interface.

Further, according to the embodiment, the interface conversion circuit 60 is connected with a signal control circuit 62. Regarding the initialization operation of the information processing apparatus 10, the signal control circuit 62 forcibly asserts a DASP signal, so that the time required when the interface conversion circuit 60 determines whether the DASP signal is asserted can be shortened.

Figure 2:
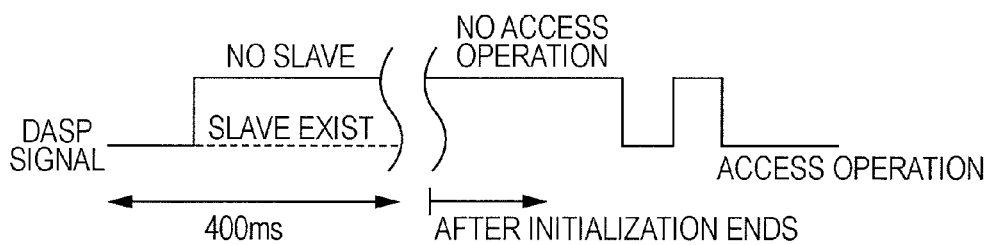
FIG. 2 is a timing chart showing a change in a DASP signal of an information processing apparatus according to one embodiment of the present invention.

As shown in FIG. 2, when the system starts to operate, that is, the system is initialized, the interface conversion circuit 60 determines if only a master (device 0) is connected to the information processing apparatus 10, or if the master (device 0) is connected to the information processing apparatus 10 together with a slave (device 1) by using the DASP signal.

In detail, during the initialization of the information processing apparatus 10, the slave (device 1) asserts the DASP signal within 400 ms after the reset of the hard disk drive is cancelled, thereby informing a host of the existence of the slave (device 1). The DASP signal output from the slave (device 1) and the master (device 0) is input to the host through an OR operation of a wired OR circuit. According to the embodiment, the host may correspond to the interface conversion circuit or another circuit of the information processing apparatus 10.

Basically, the master (device 0) is configured to assert the DASP signal from 450 ms to 5 seconds after the hard disk drive reset is cancelled. If the DASP signal is asserted within 400 ms (in the case of a low level according to the embodiment), the host can determine that the master (device 0) and the slave (device 1) have been connected to the information processing apparatus 10. However, if the DASP signal is not asserted within 400 ms (in the case of a high level according to the embodiment), the host can determine that only the master (device 0) has been connected to the information processing apparatus 10.

As described above, 5 seconds are required to monitor the DASP signals of the slave (device 1) and the master (device 0). Further, the interface conversion circuit 60 according to the embodiment monitors the DASP signals for change for about 5 seconds during the initialization of the information processing apparatus 10. In other words, about 5 seconds at maximum is required until the information processing apparatus 10 starts to operate after the information processing apparatus 10 is powered on by a user. The 5 seconds may not be an issue in a personal computer having a long start time. However, problems may occur in a small-sized image display apparatus called a photo viewer, a portable music player and the like because a user may feel inconvenienced when using such devices.

Figure 3:
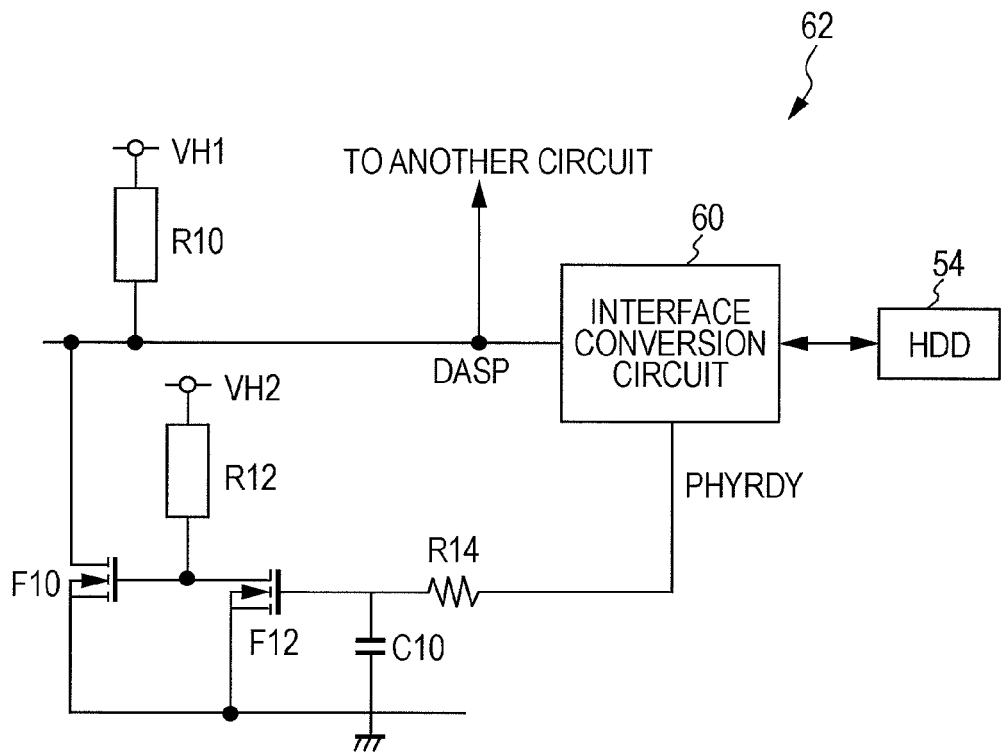
FIG. 3 is a circuit diagram showing an internal configuration of a signal control circuit of an information processing apparatus according to a first embodiment of the present invention.

In this regard, the information processing apparatus 10 according to the embodiment includes the signal control circuit 62. FIG. 3 is a circuit diagram of the signal control circuit 62 according to the embodiment.

As shown in FIG. 3, the signal control circuit 62 according to the embodiment includes resistors R10, R12 and R14, a capacitor C10 and N channel FETs F10 and F12. According to the above configuration, the signal control circuit 62 controls the DASP signal using a PHYRDY (physical layer ready) signal output from the interface conversion circuit 60.

The PHYRDY signal represents that serial ATA communication is enabled after the initialization of a physical layer is completed. In detail, when the PHYRDY signal has been negated at a low level, it represents performance of a power-on reset, that is, failure in the initialization of the physical layer. However, when the PHYRDY signal has been asserted at a high level, the initialization of the physical layer has normally been completed, so communication between the hard disk drive 54 and the interface conversion circuit 60 is assumed, so that the serial ATA communication is enabled.

The resistors R10 and R12 are pull-up resistors. According to the embodiment, the resistor R10 is connected to high level voltage VH1 and the resistor R12 is connected to high level voltage VH2. According to the embodiment, the high level voltage VH1 is equal to the high level voltage VH2.

The resistor R14 and the capacitor C10 form a delay circuit according to the embodiment. In detail, when the PHYRDY signal is changed from the low level to the high level, predetermined delay time T1 is generated by the delay circuit. The delay time T1 is determined by a time constant of the resistor R14 and the capacitor C10.

When the information processing apparatus 10 is powered on and initialization thereof is performed, the PHYRDY signal is at the low level and the DASP signal is at the low level. If the initialization is performed such that the serial ATA communication is enabled, the PHYRDY signal is asserted such that the PHYRDY signal has the high level. Further, the DASP signal has the high level after the delay time T1 of the delay circuit including the resistor R14 and the capacitor C10.

In more detail, when the PHYRDY signal is initially at the low level, the N channel FET F12 is turned off and the N channel FET F10 is turned on because a gate of the N channel FET F10 has a high level due to the high level voltage VH2. Thus, the high level voltage VH1 is grounded through the resistor R10, so the DASP signal has the low level.

Figure 4:
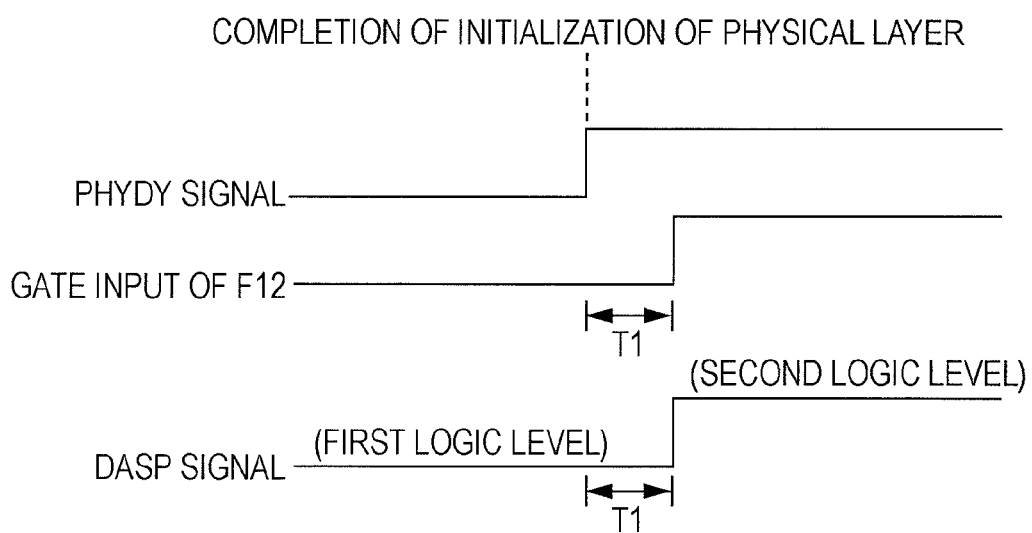
FIG. 4 is a timing chart showing a change in a PHYRDY signal, gate input of an N channel FET and a DASP signal of an information processing apparatus according to a first embodiment of the present invention.

As shown in FIG. 4, if the communication between the hard disk drive 54 and the interface conversion circuit 60 is assumed, causing the PHYRDY signal to have the high level, the PHYRDY signal is input to a gate of the N channel FET F12 after being delayed by the delay time T1, so that the N channel FET F12 is turned on. If the N channel FET F12 is turned on, the high level voltage VH2 is grounded through the N channel FET F12 and the gate of the N channel FET F10 has a low level, so the N channel FET F10 is turned off and the DASP signal has the high level due to the high level voltage VH1.

The interface conversion circuit 60 detects that the DASP signal has the low level, that is, the DASP signal has been asserted, for the delay time T1 determined by the resistor R14 and the capacitor C10. Then, the interface conversion circuit 60 determines that the slave (device 1) is connected to the information processing apparatus 10, and performs the start process. That is, the interface conversion circuit 60 performs the subsequent processing without stopping the start process for about 5 seconds based on monitoring for change in the DASP signal, thereby preventing the information processing apparatus 10 from stopping the start process for 5 seconds while in a state of waiting for change in the DASP signal.

Further, according to the information processing apparatus 10 of the embodiment, the hard disk drive 54 is the master (device 0) and the slave (device 1) cannot be connected to the master (device 0). In other words, the slave (device 1) cannot be connected to the hard disk drive 54. Thus, the information processing apparatus 10, which starts to operate, performs various settings and operations under the condition that the slave (device 1) is not connected to the hard disk drive 54. Further, even if the DASP signal is forcibly maintained at the low level by the signal control circuit 62, the information processing apparatus 10 can perform the subsequent processing without problems.

Second Embodiment

In general, after initialization is completed, since the master (device 0) and the slave (device 1) can assert the DASP signal at an arbitrary timing, the DASP signal is used to represent the presence or absence of an access operation of the hard disk drive 54. For example, when the hard disk drive 54 performs the access operation, the hard disk drive 54 causes the DASP signal to have the low level. However, when the hard disk drive 54 does not perform the access operation, a terminal of the DASP signal in the hard disk drive 54 is in a high impedance state, so the DASP signal has a high level due to the pull-up resistor.

For example, the information processing apparatus 10 can turn on and off an access lamp, which notifies a user of the presence or absence of the access operation of the hard disk drive 54, by using the DASP signal, or performs a correction operation during the calculation of the battery level based on the presence or absence of the access operation of the hard disk drive 54. According to the second embodiment, the information processing apparatus 10 having such functions can shorten the start time and effectively use the DASP signal after the initialization operation is completed. Hereinafter, the second embodiment will be described while focusing on the differences relative to the first embodiment.

The information processing apparatus 10 according to the second embodiment has an internal configuration equal to that of the information processing apparatus 10 according to the first embodiment as shown in FIG. 1, except for the configuration of the signal control circuit 62.

Figure 5:
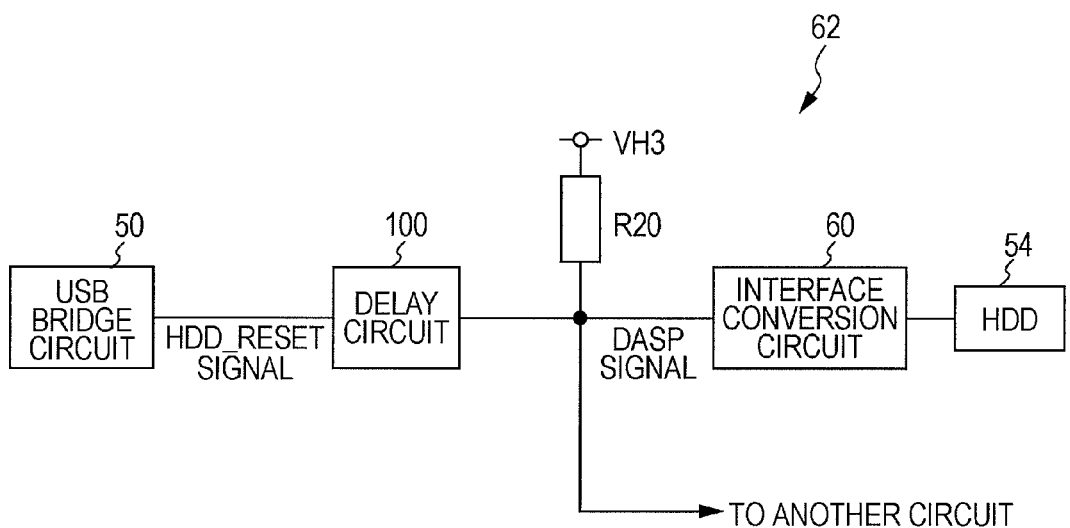
FIG. 5 is a circuit diagram showing an internal configuration of a signal control circuit of an information processing apparatus according to a second embodiment of the present invention.

FIG. 5 is a block diagram showing an internal configuration of the signal control circuit 62 according to the present embodiment. As shown in FIG. 5, the signal control circuit 62 according to the embodiment includes a delay circuit 100 and a resistor R20. The delay circuit 100 receives a HDD_RESET signal from a USB bridge circuit 50. The HDD_RESET signal has a low level when the information processing apparatus 10 is powered on, but has a high level after the initialization of the host is completed. The delay circuit 100 delays the received HDD_RESET signal by predetermined time T2 to output the DASP signal. For example, the delay circuit 100 may include a resistor and a capacitor equal to those of the first embodiment. In such a case, the delay time T2 is determined by a time constant of the resistor and the capacitor.

Further, when the received HDD_RESET signal has the high level, a terminal of the DASP signal in the delay circuit 100 is in a high impedance state. Referring to FIG. 5, since high level voltage VH3 is connected through a resistor R20, if the output terminal of the DASP signal in the delay circuit 100 is in the high impedance state, the DASP signal has a high level.

Further, since the delay circuit 100 is in the high impedance state, the interface conversion circuit 60 allows the DASP signal to be grounded, so that the logic level of the DASP signal is switched to the low level from the high level. In detail, the interface conversion circuit 60 can arbitrarily switch the logic level of the DASP signal to the high level or the low level based on the presence or absence of the access operation of the hard disk drive 54.

Figure 6:
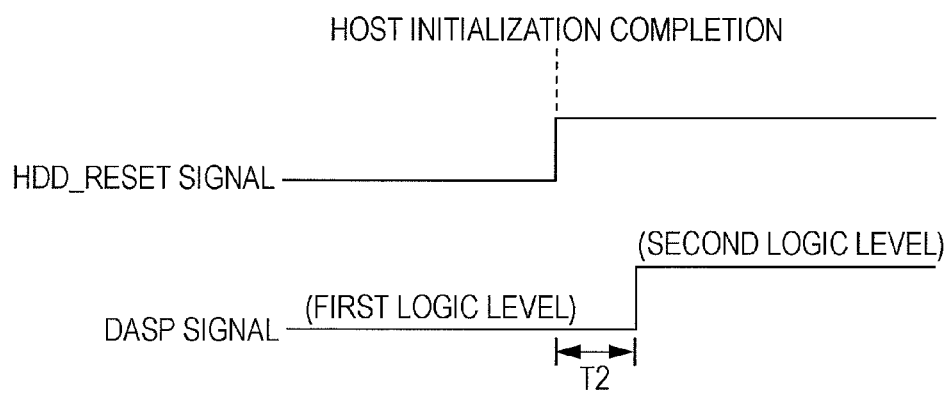
FIG. 6 is a timing chart showing a change in a HDD_RESET signal and a DASP signal of an information processing apparatus according to a second embodiment of the present invention.

FIG. 6 is a timing chart showing a change in the HDD_RESET signal and the DASP signal during the initialization operation of the information processing apparatus. As shown in FIG. 6, when the information processing apparatus 10 is powered on, that is, when the information processing apparatus 10 is initialized, the HDD_RESET signal has the low level. However, after the system initialization operation of the information processing apparatus 10 serving as a host is completed, the logic level of the HDD_RESET signal is switched to the high level from the low level.

If the logic level of the HDD_RESET signal is switched to the high level, the delay circuit 100 delays the HDD_RESET signal by the delay time T2, so that the logic level of the DASP signal is switched to the high level from the low level. Then, the logic level of the DASP signal can be switched to the high level or the low level under the control of the interface conversion circuit 60. In detail, in the case in which the hard disk drive 54 is not accessed, the DASP signal has the high level. However, in the case in which the hard disk drive 54 is accessed, the DASP signal has the low level.

Further, after the initialization of the host is completed, the interface conversion circuit 60 detects that the DASP signal has the low level for the delay time T2, that is, the DASP signal has been asserted. Then, the interface conversion circuit 60 determines that the slave (device 1) is connected to the information processing apparatus 10, and performs the start process. That is, the interface conversion circuit 60 performs the subsequent processing without stopping the start process for about 5 seconds based on monitoring for change in the DASP signal, thereby preventing the information processing apparatus 10 from stopping the start process for 5 seconds while in a state of waiting for change in the DASP signal.

Similarly to the first embodiment, according to the information processing apparatus 10, the hard disk drive 54 is the master (device 0) and the slave (device 1) cannot be connected to the master (device 0). In other words, the slave (device 1) cannot be connected to the information processing apparatus 10. Thus, the information processing apparatus 10, which starts to operate, performs various settings and operations under the condition that the slave (device 1) is not connected to the hard disk drive 54. Further, even if the DASP signal is forcibly maintained at the high level by the signal control circuit 62, the information processing apparatus 10 can perform the subsequent processing without problems.

After the start process is completed, the interface conversion circuit 60 can notify the host of the presence or absence of the access to the hard disk drive 54 by using the DASP signal. For example, the information processing apparatus 10 can turn on and off an access lamp, which notifies a user of the access to the hard disk drive 54, by using the DASP signal, or perform a correction operation during the calculation of the battery level based on the presence or absence of the access to the hard disk drive 54. That is, the DASP signal can be randomly received and used by another circuit in the information processing apparatus 10.

Further, the present invention is not limited to the above embodiments and can be modified in various ways. For example, the logic level of each signal in the above embodiments is for example only, and the low level and the high level can be properly changed according to the circuit design. For example, according to the above embodiments, when determining the presence or absence of connection of the slave (device 1), the DASP signal is in the asserted state (the first logic level state) when the DASP signal has the low level, and the DASP signal is in the negated state (the second logic level state) when the DASP signal has the high level. However, the DASP signal can be defined that the DASP signal is in the asserted state (the first logic level state) when the DASP signal has the high level, and the DASP signal can be defined that the DASP signal is in the negated state (the second logic level state) when the DASP signal has the low level.

Further, according to the above embodiments, the conversion circuit connected to the hard disk drive 54 performs the interface conversion between the ATA interface and the serial ATA interface. However, the present invention can adopt an interface conversion circuit that performs an interface conversion between interfaces having specifications different from each other. Furthermore, the present invention is not limited to the conversion circuit that performs the interface conversion. That is, the present invention can adopt a conversion circuit which can be connected to the hard disk drive 54 to perform signal conversion.

What is claimed is:

1. An information processing apparatus comprising:
   a first hard disk drive;
   a conversion circuit connected with the first hard disk drive to determine whether a second hard disk drive corresponding to a slave exists when the first hard disk drive serves as a master, and to determine whether a first control signal has a first logic level in a first predetermined time; and
   a signal control circuit that allows the first control signal to have the first logic level in the first predetermined time in response to a second control signal, which is generated when the first hard disk drive starts, regardless of existence of the second hard disk drive,
   wherein the conversion circuit monitors change in the first control signal to stop a start process before the first predetermined time ends when the first control signal has a second logic level, and performs the start process even if the first predetermined time has not passed when it is detected that the first control signal has the first logic level.

2. The information processing apparatus according to claim 1, wherein the second control signal includes a physical layer ready signal which represents that initialization of communication between the first hard disk drive and the conversion circuit has been completed.

3. The information processing apparatus according to claim 2, wherein, when completion of the initialization of the communication between the first hard disk drive and the conversion circuit is detected through change in the physical layer ready signal, the signal control circuit detects the change in the physical layer ready signal to delay the physical layer ready signal by a second predetermined time such that the first control signal is switched from the first logic level to the second logic level, and the conversion circuit detects that the first control signal has the first logic level during the second predetermined time.

4. The information processing apparatus according to claim 1, wherein the second control signal includes a hard disk drive reset signal for resetting the first hard disk drive.

5. The information processing apparatus according to claim 4, wherein, when cancellation of reset of the first hard disk drive is detected through change in the hard disk drive reset signal, the signal control circuit detects the change in the hard disk drive reset signal to delay the hard disk drive reset signal by a third predetermined time such that the first control signal is switched from the first logic level to the second logic level, and the conversion circuit detects that the first control signal has the first logic level during the third predetermined time.

6. The information processing apparatus according to claim 5, wherein the signal control circuit allows the conversion circuit to arbitrarily switch a logic level of the first control signal to the first logic level or the second logic level when output of the first control signal is in a high impedance state after passage of the third predetermined time, and the conversion circuit uses the first control signal as a signal, which represents presence or absence of access to the first hard disk drive, after the passage of the third predetermined time.

7. The information processing apparatus according to claim 1, wherein the first hard disk drive has a structure in which the second hard disk drive serving as the slave is not connected with the first hard disk drive, and the information processing apparatus starts an operation in a state in which the second hard disk drive serving as the slave is not connected with the first hard disk drive.

8. A method for controlling an information processing apparatus including a first hard disk drive and a conversion circuit connected with the first hard disk drive, the method comprising:
determining by the conversion circuit whether a second hard disk drive corresponding to a slave exists when the first hard disk drive serves as a master, and whether a first control signal has a first logic level in a first predetermined time;
monitoring by the conversion circuit change in the first control signal to stop a start process before the first predetermined time ends when the first control signal has a second logic level, and performing the start process even if the first predetermined time has not passed when it is detected that the first control signal has the first logic level; and
performing by the conversion circuit the start process by allowing the first control signal to have the first logic level in the first predetermined time in response to a second control signal, which is generated when the first hard disk drive starts, regardless of existence of the second hard disk drive.

* * * * *